(12) United States Patent
Saiki (10) Patent No.: US 11,190,663 B2
(45) Date of Patent: Nov. 30, 2021

(54) IMAGE SCANNING APPARATUS HAVING SCANNER AND IMAGE PROCESSOR, CONTROL METHOD THEREFOR, AND STORAGE MEDIUM STORING PROGRAM FOR EXECUTING CONTROL METHOD

(71) Applicant: CANON KABUSHIKI KAISHA, Tokyo (JP)

(72) Inventor: Kenji Saiki, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/101,152

(22) Filed: Nov. 23, 2020

(65) Prior Publication Data

US 2021/0195046 A1 Jun. 24, 2021

(30) Foreign Application Priority Data

Dec. 18, 2019 (JP) .............................. JP2019-228438

(51) Int. Cl.
*H04N 1/00* (2006.01)
*G06F 3/12* (2006.01)
*H04N 1/04* (2006.01)

(52) U.S. Cl.
CPC ....... *H04N 1/00917* (2013.01); *G06F 3/1204* (2013.01); *G06F 3/1263* (2013.01); *H04N 1/00925* (2013.01); *H04N 1/00957* (2013.01); *H04N 1/0405* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2004/0057066 A1* | 3/2004 | Sugishita | ........... | H04N 1/32502 358/1.13 |
| 2009/0045249 A1* | 2/2009 | Miyasake | .......... | H04N 1/00355 235/375 |
| 2009/0225364 A1* | 9/2009 | Sato | ...................... | G06F 3/1222 358/1.15 |
| 2020/0409641 A1* | 12/2020 | Degawa | ............. | H04N 1/00923 |

FOREIGN PATENT DOCUMENTS

JP H08237403 A 9/1996

\* cited by examiner

*Primary Examiner* — Miya J Williams
(74) *Attorney, Agent, or Firm* — Rossi, Kimms & McDowell LLP

(57) ABSTRACT

An image scanning apparatus that is capable of executing control about an interrupt scan without using another apparatus. The image scanning apparatus includes a scanner and a controller. The scanner scans a document. The controller determines whether interrupt execution of a second scan that is different from a first scan is permitted based on a setting relevant to the first scan that is being executed. The scanner executes the second scan after suspending the first scan in a case where the interrupt execution of the second scan is permitted, and the scanner restarts the first scan after executing the second scan.

9 Claims, 10 Drawing Sheets

| | FINISHING SETTING | SUSPENSION POSSIBILITY |
|---|---|---|
| COPY | SORT | ○ |
| | GROUP | ○ |
| | STAPLE | △ |

FIG. 5B

| | FILE FORMAT | SUSPENSION POSSIBILITY |
|---|---|---|
| SEND | PDF | △ |
| | JPEG | ○ |
| | TIFF | ○ |

FIG. 5C

| | FILE FORMAT | SUSPENSION POSSIBILITY |
|---|---|---|
| BOX | PDF | ○ |
| | JPEG | ○ |
| | TIFF | ○ |

IMAGE SCANNING APPARATUS HAVING SCANNER AND IMAGE PROCESSOR, CONTROL METHOD THEREFOR, AND STORAGE MEDIUM STORING PROGRAM FOR EXECUTING CONTROL METHOD

BACKGROUND OF THE INVENTION

Field of the Invention

The present invention relates to an image scanning apparatus, a control method therefor, and a storage medium storing control program for executing the control method.

Description of the Related Art

An MFP is known as an image scanning apparatus having a scanner and an image processor. The MFP executes a scan image process with using the scanner and the image processor. In the scan image process, the scanner one-by-one scans documents of a bundle stacked on a document tray of the MFP and transfers scanned data to the image processor. The image processor applies an image process to the data obtained from the scanner. The document scanned by the scanner is output to a discharge tray of the MFP.

When scanning a certain document bundle, the MFP cannot scan another document bundle by interruption, for example. Accordingly, even if a user wants to scan the other document bundle, the user needs to wait until a scan under execution is completed. This is inconvenient. As compared with this, a network system that suspends a scan of a preceding document bundle and restarts the scan of the suspended document bundle after completing a scan of another document bundle is proposed (for example, see Japanese Laid-Open Patent Publication (Kokai) No. H08-237403 (JP H08-237403A)). In this network system, an apparatus (a system control apparatus, concretely) other than the MFP controls the suspension and restart of the scan. And the system control apparatus saves image data that was generated with the MFP by scanning the documents until just before the suspension.

However, the technique of the above-mentioned publication needs to prepare the system control apparatus that controls the suspension of the scan and the restart of the suspended scan aside from the MFP. That is, the conventional MFP cannot execute control about interrupt scan, which suspends the scan under execution, executes another scan by interruption, and restarts the suspended scan, without using another apparatus.

SUMMARY OF THE INVENTION

The present invention provides an image scanning apparatus, a control method therefor, and a storage medium storing a program for executing the control method, which are capable of executing control about an interrupt scan without using another apparatus.

Accordingly, a first aspect of the present invention provides An image scanning apparatus including a scanner that scans a document, a controller that determines whether interrupt execution of a second scan that is different from a first scan is permitted based on a setting relevant to the first scan that is being executed, wherein the scanner executes the second scan after suspending the first scan in a case where the interrupt execution of the second scan is permitted, and wherein the scanner restarts the first scan after executing the second scan.

Accordingly, a second aspect of the present invention provides a control method for an image scanning apparatus that scans a document, the control method including determining whether interrupt execution of a second scan that is different from a first scan is permitted based on a setting relevant to the first scan that is currently executed, executing the second scan after suspending the first scan in a case where the interrupt execution of the second scan is permitted, and restarting the first scan after executing the second scan.

Accordingly, a third aspect of the present invention provides a non-transitory computer-readable storage medium storing a control program causing a computer to execute the control method of the second aspect.

According to the present invention, the control about the interrupt scan is executable without using another apparatus.

Further features of the present invention will become apparent from the following description of exemplary embodiments with reference to the attached drawings.

DESCRIPTION OF THE EMBODIMENTS

Hereafter, embodiments of the present invention will be described in detail by referring to the drawings. Although the present invention is applied to an MFP as an image scanning apparatus in the embodiments, a target to which the present invention is applied is not restricted to the MFP. The present invention may be applied to an apparatus like a scanner that is provided with at least a scan function to scan a placed document.

Figure 1:
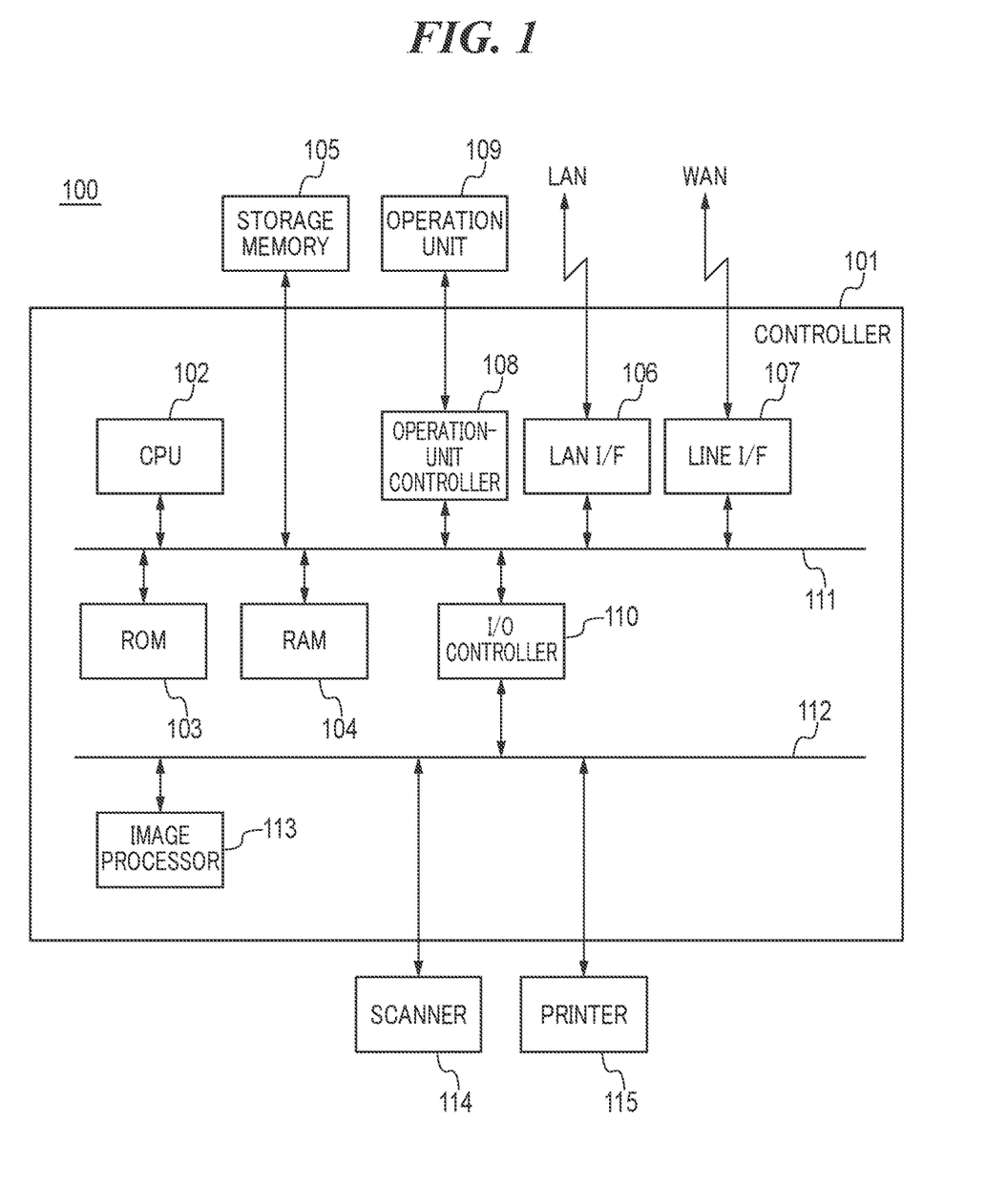
FIG. 1 is a block diagram schematically showing a configuration of an MFP as an image scanning apparatus concerning an embodiment of the present invention.

FIG. 1 is a block diagram schematically showing a configuration of an MFP 100 as an image scanning apparatus concerning an embodiment of the present invention.

As shown in FIG. 1, the MFP 100 is provided with a controller 101, a storage memory 105, an operation unit 109, a scanner 114, and a printer 115. The controller 101 is connected with the storage memory 105, the operation unit 109, the scanner unit 114, and the printer 115. Moreover, the controller 101 is provided with a CPU 102, a ROM 103, a RAM 104, a LAN I/F 106, a line I/F 107, an operation-unit controller 108, an TO controller 110, and an image processor 113. The CPU 102, ROM 103, RAM 104, LAN I/F 106, line I/F 107, the operation-unit controller 108, and TO controller 110 are mutually connected through a system bus 111. The image processor 113 is connected with the IO controller 110 through an image bus 112.

The controller 101 totally controls the entire MFP 100. The CPU 102 runs programs stored in the ROM 103 or the storage memory 105 to control software modules (not shown) of the MFP 100 to execute respective processes. The ROM 103 stores a boot program of the system. The RAM 104 is a system work memory area for the CPU 102 to execute the software modules (not shown) of the MFP 100. Moreover, the RAM 104 is an image memory for storing image data temporarily when the image data is processed. The storage memory 105 consists of an HDD or an SSD (Solid State Drive) and is used as internal storage. The storage memory 105 stores a system software module that achieves functions of the MFP 100 and image data that is transferred from the RAM 104, for example.

The LAN I/F 106 is an interface for connecting the MFP 100 to a LAN. The LAN I/F 106 performs data communication with an external apparatus connected to the LAN. The line I/F 107 is an interface for connecting the MFP 100 to a WAN. The line I/F 107 performs data communication with an external apparatus connected to the WAN. The operation-unit controller 108 is an interface of the controller 101 and the operation unit 109. For example, the operation-unit controller 108 outputs a VGA signal to the operation unit 109 to display an image corresponding to the VGA signal on the operation unit 109. Moreover, the operation-unit controller 108 outputs information that the user inputs through the operation unit 109 to the CPU 102. The operation unit 109 consists of an LCD touch panel etc. The operation unit 109 interprets a VGA signal output from the operation-unit controller 108 and displays an image corresponding to the VGA signal.

The IO controller 110 is a bus bridge that connects the system bus 111 with the image bus 112 and converts the data structure of the system bus 111. The image bus 112 consists of a general-purpose bus, such as the PCI bus, IEEE 1394, or PCIEx, and transfers image data at high speed. In addition to the IO controller 110 and the image processor 113, the scanner 114 and the printer 115 are also connected to the image bus 112. The image bus 112 converts image data between a synchronous system and an asynchronous system. The image processor 113 consists of a plurality of ASICs. The image processor 113 applies image processes, such as a resolution conversion process, a compression process, an expansion process, and a binary-multivalued conversion process, to image data. The scanner 114 is provided with a DF (Document Feeder) 200 of FIG. 2. The scanner 114 scans a document and generates image data. The printer 115 prints the image data that the scanner 114 generates.

Figure 2:
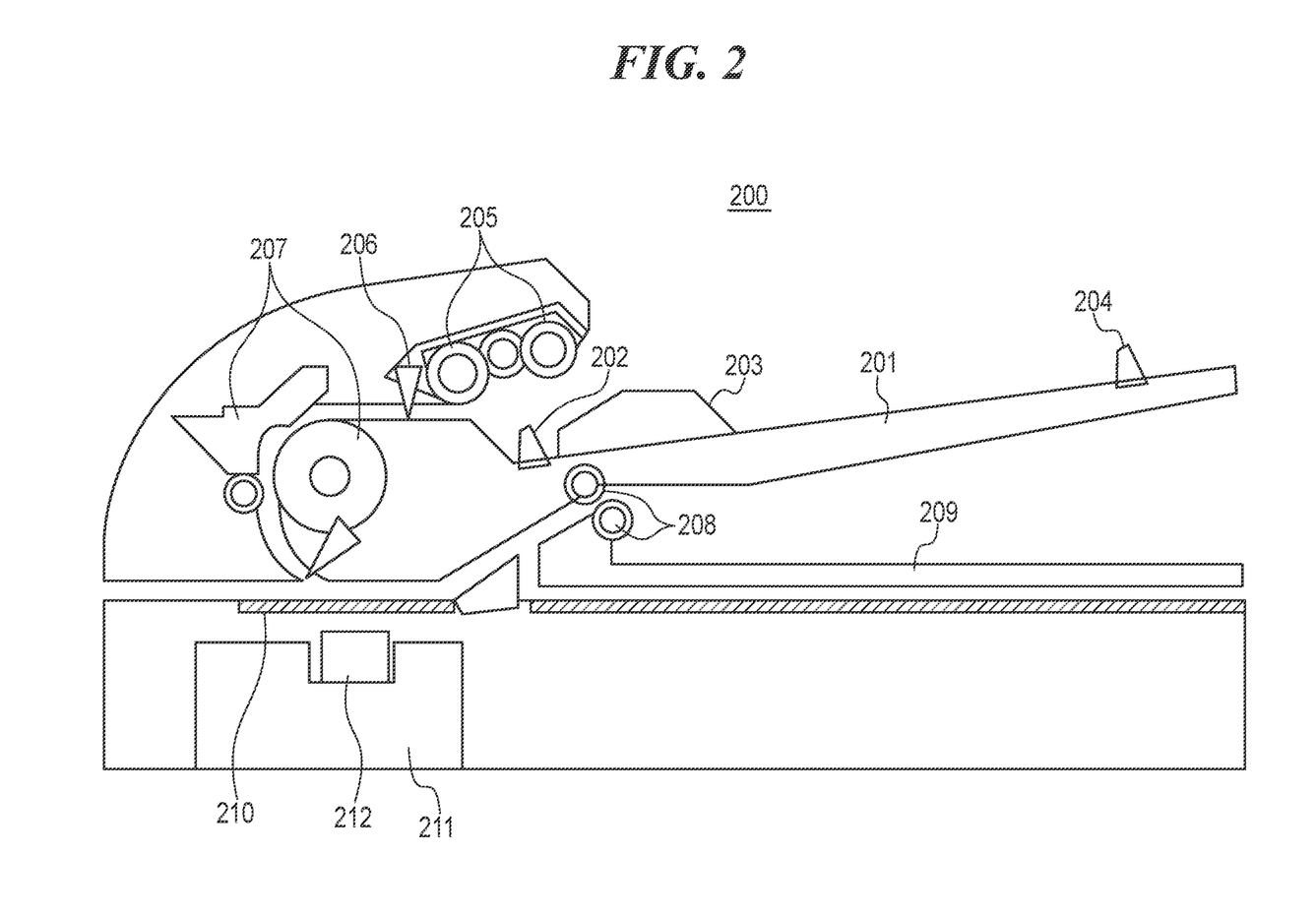
FIG. 2 is a side view showing an internal structure of a document feeder (DF) of a scanner in FIG. 1.

FIG. 2 is a side view showing an internal structure of the DF 200 of the scanner 114 in FIG. 1. It should be noted that FIG. 2 shows the internal structure as transparent in order to facilitate understanding.

The DF 200 is provided with a document tray 201 on which a document is placed. The document tray 201 is provided with a document sensor 202, a pair of document guides 203, and a document-size detection sensor 204. The document sensor 202 detects whether a document is placed on the document tray 201. The pair of document guides 203 are arranged so as to face each other in a direction that intersects perpendicularly with a conveyance direction of a document. The document placed on the document tray 201 is conveyed by three sets of rollers including a pickup roller pair 205, a conveyance roller 207, and a discharge roller pair 208. The pickup roller pair 205 conveys the document placed on the document tray 201 to a document conveyance path (not shown) of the DF 200.

The document conveyed by the pickup roller pair 205 is detected by a document passage detection sensor 206. In the DF 200, it is determined whether the first document has passed through on the basis of a period that the document passage detection sensor 206 detected. The conveyance roller 207 conveys the document that is conveyed to the document conveyance path by the pickup roller pair 205 toward the document discharge roller pair 208. The discharge roller pair 208 conveys the document that is conveyed by the conveyance roller 207 to the document discharge tray 209. It should be noted that the pickup roller pair 205, the conveyance roller 207, and the discharge roller pair 208 are driven with a stepping motor (not shown).

A sensor unit 211 scans the document conveyed to the above-mentioned document conveyance path when the document passes a transparent DF reading window 210 provided in the document conveyance path concerned. The sensor unit 211 is provided with a CIS (Contact Image Sensor) 212. The document conveyed to the above-mentioned document conveyance path is arranged at a position that the sensor unit 211 is able to read through the DF reading window 210.

The sensor unit 211 is movable in a subscanning direction. For example, the sensor unit 211 moves in the same direction as the conveyance direction of the document conveyed from the conveying roller 207 to the discharge roller pair 208. It should be noted that the DF reading window 210 has a certain length in the subscanning direction. The CIS 212 can move to an arbitrary position within the length and can scan a document at the moved position. The CIS 212 consists of a plurality of photoelectric conversion elements, for example, CCD elements. The CCD elements are linearly arranged in the CIS 212. The CIS 212 generates a control signal for controlling FIFO for storing pixel signals read by the CCD elements.

Figure 3:
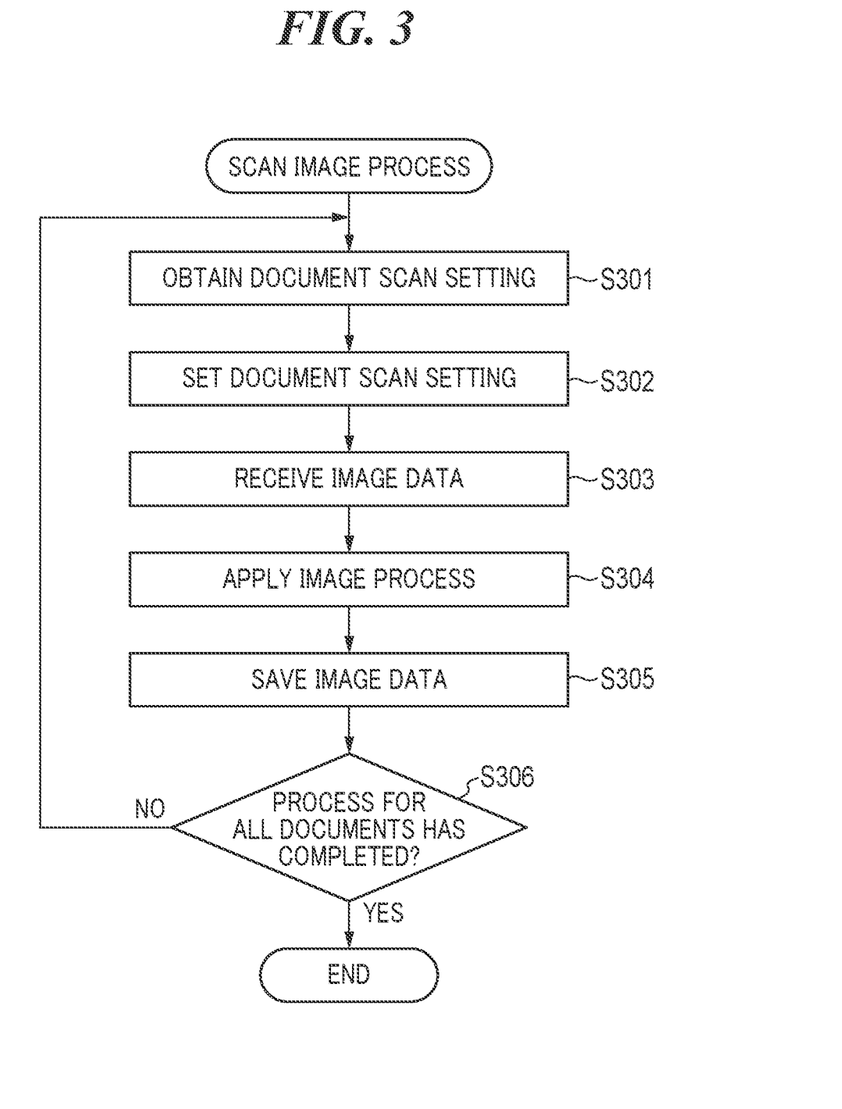
FIG. 3 is a flowchart showing procedures of a scan image process executed by the MFP of FIG. 1.

FIG. 3 is a flowchart showing procedures of a scan image process executed by the MFP 100 of FIG. 1. This process of FIG. 3 is achieved because the CPU 102 of the controller 101 reads a control program from the ROM 103 to the RAM 104 and runs the control program.

As shown in FIG. 3, the CPU 102 obtains a document scan setting included in settings (hereinafter referred to as "scan settings") concerning the scan (a step S301). Next, the CPU 102 selects an ASIC that will apply an image process to the image data obtained from the scanner 114 according to the obtained document scan setting. Then, the CPU 102 sets the document scan setting to the selected ASIC (a step S302).

Next, the CPU 102 instructs the scanner 114 to scan a document bundle stacked on the document tray 201. When receiving this instruction, the scanner 114 one-by-one scans documents of the document bundle stacked on the document tray 201 and generates the image data of the scanned documents. The CPU 102 receives the image data from the scanner 114 (a step S303). Next, the CPU 102 controls the image processor 113 to apply the image process to the received image data (a step S304). Next, the CPU 102 stores the image data to which the image process has been applied in the storage memory 105 (a step S305). Next, the CPU 102 determines whether the process for all the documents that were stacked on the document tray 201 has completed (a step S306).

As a result of the determination in the step S306, when the process for at least one of the documents that were stacked on the document tray 201 has not completed, the CPU 102 returns the process to the step S301 and performs the process for the following document. As a result of the determination in the step S306, when the process for all the documents that were stacked on the document tray 201 has completed, the CPU 102 finishes this process.

Figure 4:
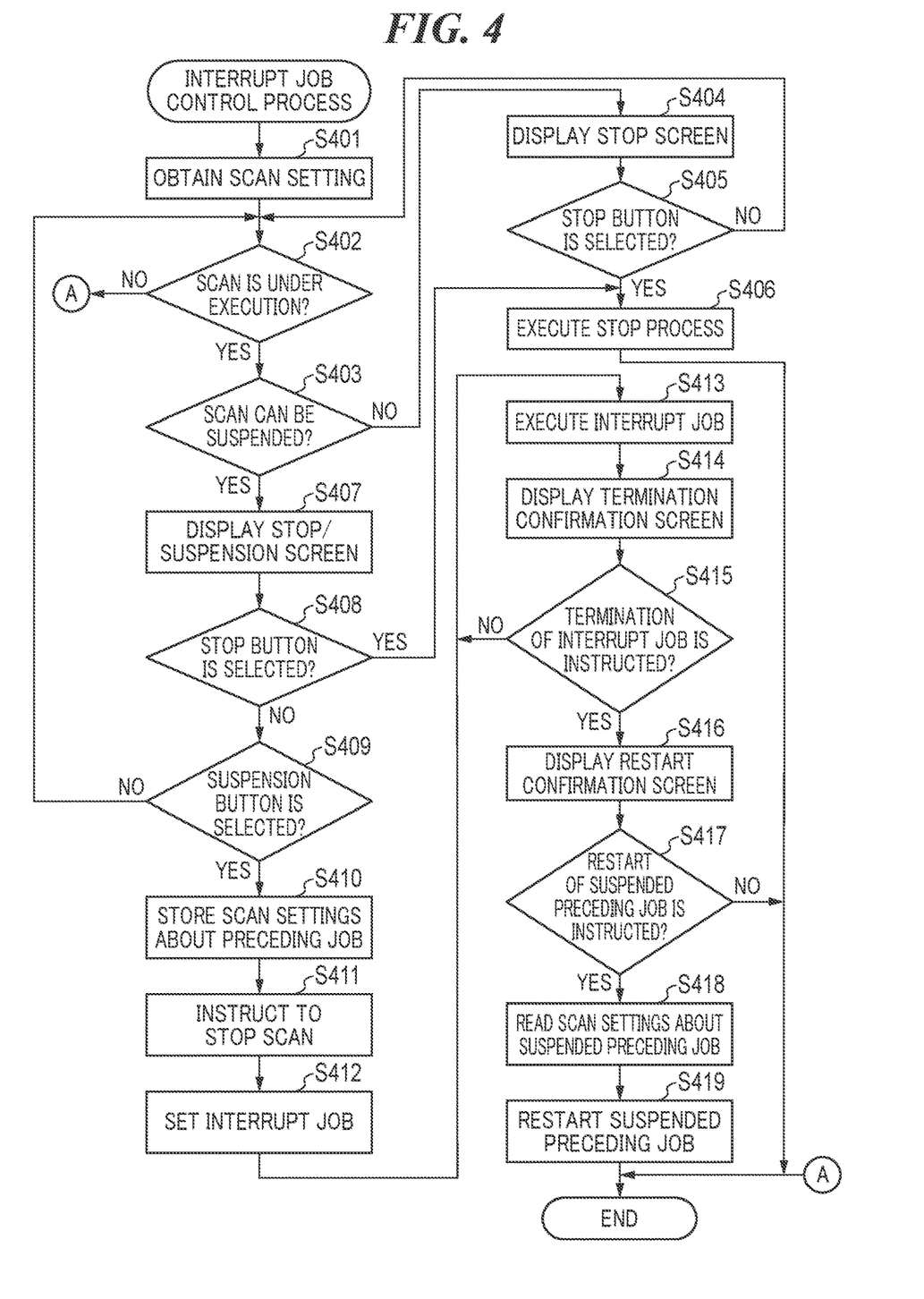
FIG. 4 is a flowchart showing procedures of an interrupt job control process executed by the MFP of FIG. 1.

FIG. 4 is a flowchart showing procedures of an interrupt job control process executed by the MFP 101 of FIG. 1. The process of FIG. 4 is achieved because the CPU 102 reads a control program from the ROM 103 to the RAM 104 and executes the control program. The process of FIG. 4 is executed when an execution instruction for a job (hereinafter referred to as a "scan-including job") accompanied by a scan with the scanner 114 is received from a user. The scan-including job is a scan job, a send job, a box job, or a copy job, for example.

The scan job includes a series of processes in which the scanner 114 reads a document and generates image data and the image processor 113 applies an image process to the image data obtained from the scanner 114. The send job performs the above-mentioned series of processes and also sends the image data, which has been subjected to the image process, to another apparatus. The box job performs the above-mentioned series of processes and also stores the image data, which has been subjected to the image process, in the storage memory 105 etc. The copy job performs the above-mentioned series of processes and also prints the image data, which has been subjected to the image process, on a sheet. Unlike the conventional interrupt copy, the MFP 101 of the embodiment is able to suspend a scan of a document bundle under execution of a copy job and is able to scan another document that is replaced on the document tray 201.

As shown in FIG. 4, the CPU 102 obtains scan settings in a scan-including job that a user instructs to execute (a step S401). In the step S401, when the above-mentioned scan-including job is a copy job, the CPU 102 obtains scan settings, such as a setting about color/monochrome, the number of copies, a setting about single side/double side, and a finishing setting of a result of the copy job mentioned later. When the above-mentioned scan-including job is a send job, the CPU 102 obtains a scan setting about a file format of image data that will be sent. When the above-mentioned scan-including job is a box job, the CPU 102 obtains a scan setting about a file format of image data that will be stored. Next, the CPU 102 determines whether a scan with the scanner 114 is under execution (a step S402).

As a result of the determination in the step S402, when no scan with the scanner 114 is under execution (i.e., when a scan with the scanner 114 has finished), the CPU 102 executes the remaining process in the scan-including job and finishes this process. As a result of the determination in the step S402, when the scan with the scanner 114 is under execution, the CPU 102 determines in a step S403 whether the scan (first scan) under execution can be suspended on the basis of the scan setting obtained in the step S401. It should be noted that a scan under execution is indicated as an "executing scan" and that a job accompanied by this scan is indicated as an "executing job".

Figure 5A:
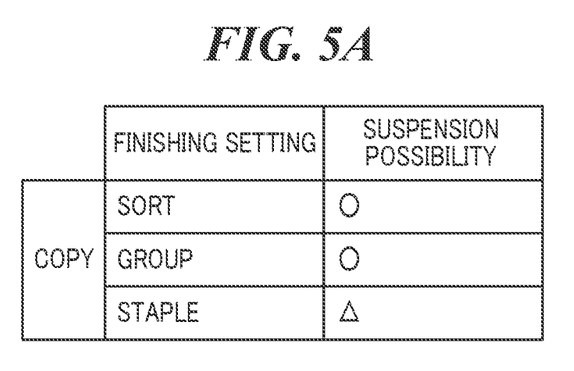
FIG. 5A, FIG. 5B, and FIG. 5C are views for describing determination in a step S403 in FIG. 4.

For example, when a scan-including job that is instructed to execute is a copy job, the CPU 102 determines whether an executing scan can be suspended on the basis of the finishing setting obtained in the step S401 by referring to FIG. 5A. In the finishing setting, settings about post-processes, such as "sort" that discharges printed sheets together for every copy, "group" that discharges printed sheet together for every page, and "staple" that fastens printed sheets with stapler, are set.

When the finishing setting is the "sort" or the "group", a user is able to restart a suspended scan easily by once retracting documents stacked on the document tray 201 and the printed sheets discharged to the discharge tray at a time of suspension and by returning the documents and printed sheets at a time of restart. Accordingly, when the finishing setting is the "sort" or the "group", the CPU 102 determines that the executing scan can be interrupted. In the meantime, when the finishing setting is the "staple", the printed sheets on which images of respective pages are printed are stocked on an intermediate tray (not shown) of the printer 115 one by one and the printed sheets are fastened with staplers when all the printed sheets gather.

The intermediate tray is a configuration of stocking sheets conveyed inside the apparatus. Accordingly, although a user is able to retract printed sheets stocked halfway at a time of suspension, the printed sheets cannot be returned manually at a time of restart. That is, the user cannot reproduce the status at the time of suspension and cannot restart the suspended scan. Accordingly, when the finishing setting is the "staple", the CPU 102 determines that the executing scan cannot be suspended.

Figure 5B:
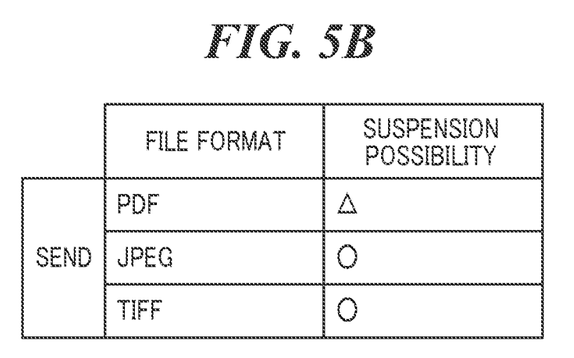

Moreover, when a scan-including job that is instructed to execute is a send job, the CPU 102 determines whether an executing scan can be suspended on the basis of the setting of the file format obtained in the step S401 by referring to FIG. 5B. The file format is set from among JPEG, TIFF, PDF, etc.

When the file format is JPEG or TIFF, images of a plurality of pages scanned with the scanner 114 are output as a plurality of image data corresponding to the respective pages. In the send job of such a file format, even if a scan is suspended, the MFP 100 is able to send image data that has been generated until just before the suspension to an external apparatus. Accordingly, when the file format in the send job is JPEG or TIFF, the CPU 102 determines that the executing scan can be suspended.

In the meantime, when the file format is PDF, images of a plurality of pages scanned with the scanner 114 are output as one image data. In the send job of such a file format, when the scan is suspended, there is concern that incomplete image data in which images of some pages lack is sent to an external apparatus. Accordingly, when the file format in the send job is PDF, the CPU 102 determines that the executing scan cannot be suspended.

Figure 5C:
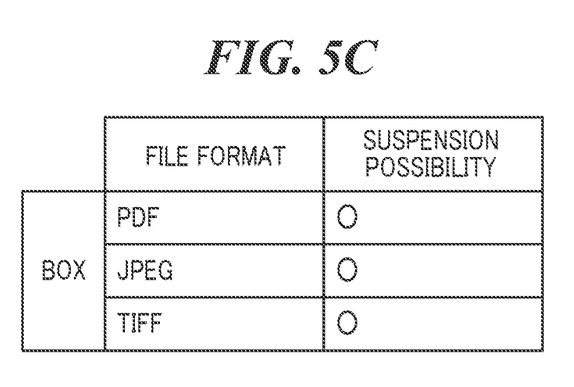

When a scan-including job that is instructed to execute is a box job, the CPU 102 determines whether an executing scan can be suspended on the basis of the setting of the file format obtained in the step S401 by referring to FIG. 5C. The file format in a box job is set from among JPEG, TIFF, PDF, etc. as well as the file format in the send job mentioned above.

When the file format is JPEG or TIFF, images of a plurality of pages scanned with the scanner 114 are output as a plurality of image data corresponding to the respective pages as mentioned above. In the box job of such a file format, even if a scan is suspended, the MFP 100 is able to store image data that has been generated until just before the suspension to the storage memory 105. Moreover, when the scan is suspended in the case where the file format is PDF, there is concern that incomplete image data in which images of some pages lack is generated. However, perfect image data including images of all the pages scanned with the scanner 114 can be generated by applying an image process that connects image data generated after restart with the image data generated before the suspension. Accordingly, the CPU 102 determines that an executing scan can be suspended, even if any file format mentioned above is set in the box job.

Figure 6A:
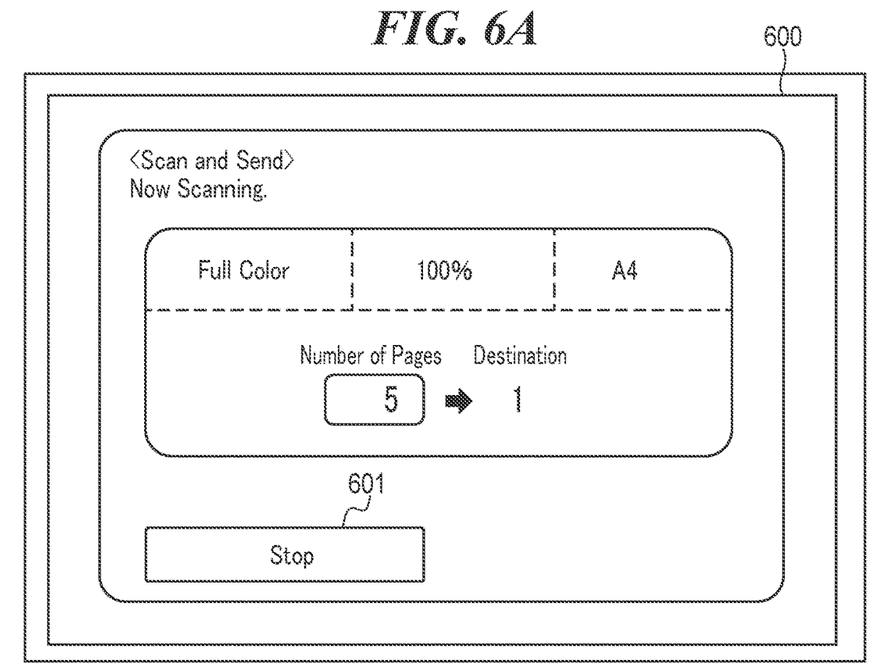
FIG. 6A and FIG. 6B are views showing examples of screens displayed on an operation unit shown in FIG. 1.

As a result of the determination in the step S403, when the executing scan cannot be suspended, the CPU 102 displays a stop screen 600 shown in FIG. 6A on the operation unit 109 (a step S404). The stop screen 600 is provided with a stop button 601. The stop button 601 is used to instruct stop of an executing job. Next, the CPU 102 determines whether the stop button 601 is selected in the stop screen 600 (a step S405).

As a result of the determination in the step S405, when the stop button 601 is not selected in the stop screen 600, the CPU 102 returns the process to the step S402. As a result of the determination in the step S405, when the stop button 601 is selected in the stop screen 600, the CPU 102 executes a stop process (a step S406). The CPU 102 stops the executing job in the stop process. Next, the CPU 102 finishes this process.

Figure 6B:
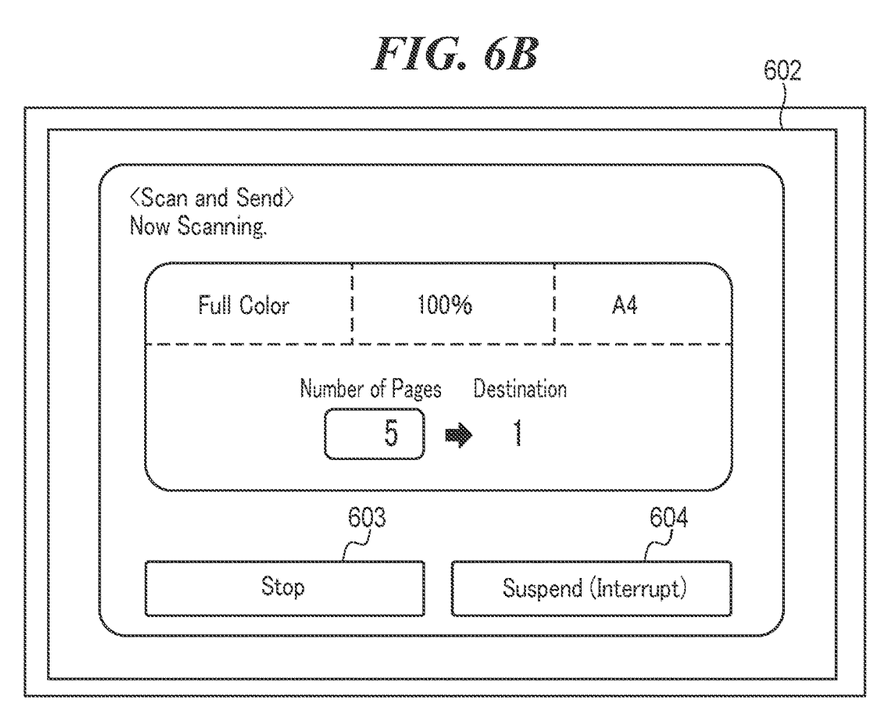

As a result of the determination in the step S403, when the executing scan can be suspended, the CPU 102 displays a stop/suspension screen 602 shown in FIG. 6B on the operation unit 109 (a step S407). The stop/suspension screen 602 is provided with a stop button 603 and a suspension button 604. The stop button 603 is used to instruct stop of an executing job. The suspension button 604 is used to instruct to execute a job (hereinafter referred to as an "interrupt job") accompanied by an interrupt scan (second scan) that is different from an executing scan after suspending an executing job (hereinafter referred to as a "preceding job"). That is, when an executing scan can be suspended, execution of an interrupt job is permitted and the suspension button 604 is displayed on the operation unit 109 in this embodiment. The user is able to select one of the stop button 603 and suspension button 604. Next, the CPU 102 determines whether the stop button 603 is selected in the stop/suspension screen 600 (a step S408).

As a result of the determination in the step S408, when the stop button 603 is selected in the stop/suspension screen 602, the CPU 102 executes the process in the step S406. As a result of the determination in the step S408, when the stop button 603 is not selected in the stop/suspension screen 602, the CPU 102 determines whether the suspension button 604 is selected in the stop/suspension screen 602 (a step S409).

As a result of the determination in the step S408, when the suspension button 604 is not selected in the stop/suspension screen 602, the CPU 102 returns the process to the step S402. As a result of the determination in the step S408, when the suspension button 604 is selected in the stop/suspension screen 602, the CPU 102 stores the scan setting of the preceding job to suspend in the storage memory 105 (a step S410). Next, the CPU 102 instructs the scanner 114 to stop the scan (a step S411, an interrupt scan controller).

The user who has confirmed the suspension of the preceding job removes the documents from the document tray 201, removes the printed sheets from the discharge tray 209, and places other documents on the document tray 201. The CPU 102 performs setting about the interrupt job on the basis of the information that the user inputs to the operation unit 109 (a step S412). Next, the CPU 102 executes the interrupt job (a step S413, the interrupt scan controller) and displays a termination confirmation screen 700 shown in FIG. 7 on the operation unit 109 (a step S414).

Figure 7:
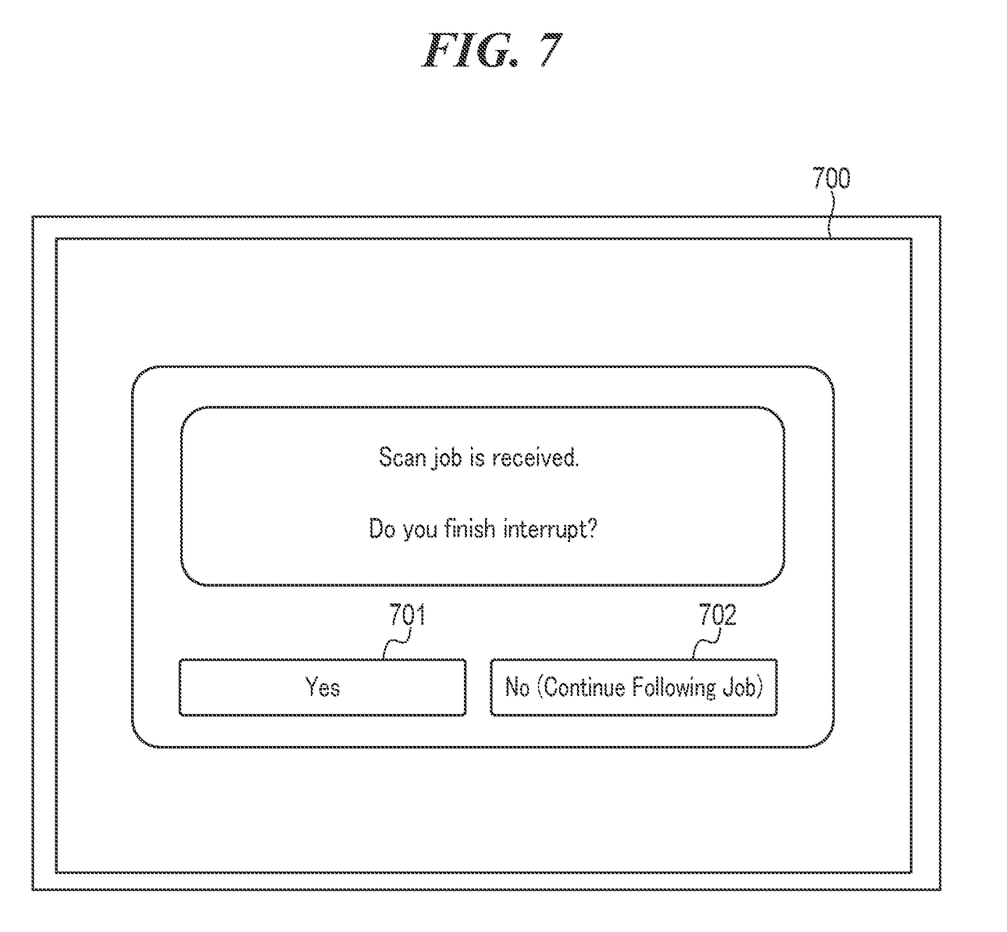
FIG. 7 is a view showing an example of a termination confirmation screen displayed on the operation unit shown in FIG. 1.

The termination confirmation screen 700 prompts a user to select termination or continuation of an interrupt job. The termination confirmation screen 700 is provided with a "Yes" button 701 and a "No" button 702. The "Yes" button 701 is used to instruct the termination of the interrupt job. The "No" button 702 is used to instruct the continuation of the interrupt job. Next, the CPU 102 determines whether the termination of the interrupt job is instructed on the basis of the selection of the "Yes" button 701 or the "No" button 702 in the termination confirmation screen 700 (a step S415).

As a result of the determination in the step S415, when the termination of the interrupt job is not instructed, the CPU 102 returns the process to the step S413. As a result of the determination in the step S415, when the termination of the interrupt job is instructed, the CPU 102 displays a restart confirmation screen 800 shown in FIG. 8 on the operation unit 109 (a step S416). The restart confirmation screen 800 prompts a user to select restart or stop of a suspended preceding job. The restart confirmation screen 800 is provided with a "Yes" button 801 and a "No" button 802. The "Yes" button 801 is used to instruct the restart of the suspended preceding job. The "No" button 802 is used to instruct the stop of the suspended preceding job. Next, the CPU 102 determines whether the restart of the suspended preceding job is instructed on the basis of the selection of the "Yes" button 801 or the "No" button 802 in the restart confirmation screen 800 (a step S417).

Figure 8:
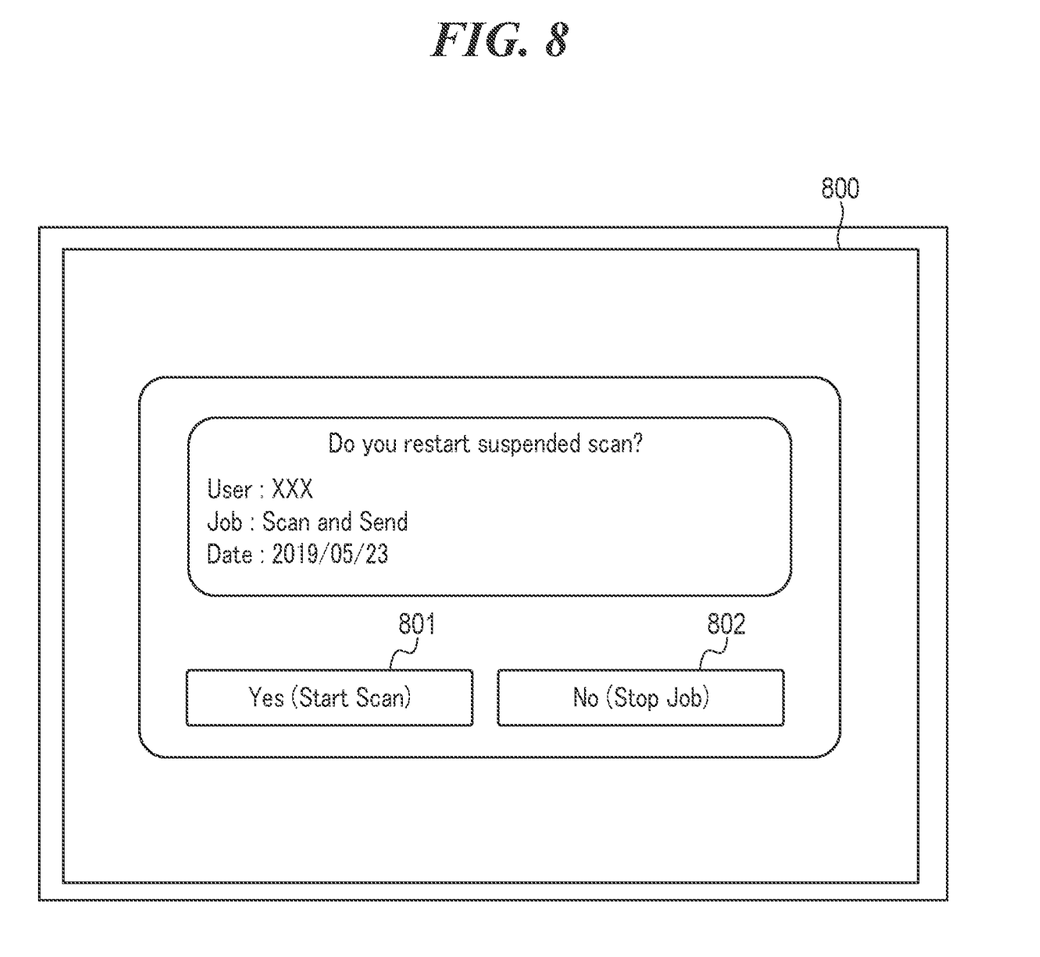
FIG. 8 is a view showing an example of a restart confirmation screen displayed on the operation unit shown in FIG. 1.

As a result of the determination in the step S417, when the stop of the suspended preceding job is instructed, the CPU 102 finishes this process. As a result of the determination in the step S417, when the restart of the suspended preceding job is instructed, the CPU 102 reads the scan setting of the suspended preceding job from the storage memory 105 (a step S418). Next, the CPU 102 restarts the suspended preceding job (a step S419). Thereby, the scan (hereinafter referred to as a "preceding scan") of the suspended preceding job is restarted. Next, the CPU 102 finishes this process.

According to the embodiment mentioned above, an interrupt scan is executed after suspending a preceding scan, and the suspended preceding scan is restarted when the interrupt scan has been completed. Whether the execution of the interrupt scan is permitted is controlled on the basis of the scan setting of the preceding job. Accordingly, the control about the interrupt scan is executable without using another apparatus.

Moreover, the scan setting of a preceding job is the finishing setting of the result of the preceding job in the embodiment mentioned above. Accordingly, the execution of the interrupt scan received while executing the job accompanied by the finishing setting is appropriately controllable.

Furthermore, when the "staple" is set in the scan setting of a preceding job, execution of an interrupt scan is not permitted in the embodiment mentioned above. When the finishing setting other than the "staple" is set in the scan setting of a preceding job, the execution of an interrupt scan is permitted. This prevents suspension of a preceding job, such as a copy job to which the "staple" is set, that a user cannot reproduce a state of a suspension timing, even if an interrupt scan is required.

In the embodiment mentioned above, the scan setting of a preceding job is a setting of the file format of a result of the preceding job. This enables appropriate control of execution of an interrupt scan that is received during execution of the preceding job to which the file format of the result is set.

Although the present invention is described with the embodiment mentioned above, the present invention is not limited to the embodiment mentioned above. For example, when a file format of a box job, which is an executing job, is set to PDF, it may be determined in the step S403 that an executing scan cannot be suspended as with a case where a file format of a send job is set to PDF. That is, when PDF, which is a predetermined file format, is set in a scan setting of a preceding job, execution of an interrupt scan is not permitted. When a file format other than the PDF format (the predetermined file format) is set in a scan setting of a preceding job, execution of an interrupt scan is permitted. This prevents generation of incomplete image data in which images of some pages lack by suspending a preceding job.

In the embodiment mentioned above, even if the finishing setting is "staple", it may be determined that an executing scan can be suspended in the step S403, when no printed sheet is stocked on the intermediate tray.

Moreover, the embodiment mentioned above describes the method that switches the display of the suspension button 604 in accordance with a suspension possibility of a scan-including job as shown in FIG. 6A and FIG. 6B. However, the present invention is not limited to this method. For example, when a scan-including job cannot be suspended, the suspension button 604 may be controlled so that a user cannot select. Specifically, the suspension button 604 may be displayed in a grayout state. Otherwise, when a user presses the suspension button 604, a message showing that a preceding job cannot be suspended may be displayed.

In the embodiment mentioned above, when an executing job is a send job, the suspension possibility of an executing scan may be determined on the basis of a combination between the setting about the file format and another setting in the step S403. For example, a case where the MFP 100 is provided with a page division function that scans images of a series of pages and outputs the images page by page in the PDF format will be described.

Since image data are output in the PDF format page by page when the page division function is set to "ON", the MFP 100 is able to send the image data that has been generated until just before the suspension to the external apparatus even if the scan is suspended. Accordingly, the CPU 102 determines that an executing job can be suspended, when a file format of a send job as the executing job is PDF and when the page division function is "ON". Such a process reduces a situation where execution of an interrupt scan is unnecessarily limited owing to a setting of the file format.

Moreover, when an executing scan belongs to a send job, the suspension possibility of the executing scan may be determined on the basis of a setting about the file transmission of the MFP 100 in the step S403 in the embodiment mentioned above. For example, when a setting to send image data to the external apparatus after generating the image data in the PDF format including images of all the scanned pages is set, incomplete image data in which images of some pages lack is never sent to the external apparatus. In such a case, the CPU 102 determines that an executing scan can be suspended. Such a process reduces a situation where execution of an interrupt scan is unnecessarily limited even if there is no inconvenience.

In the embodiment mentioned above, when an executing scan belongs to a facsimile (FAX) job, the CPU 102 preferably determines that the executing scan cannot be suspended in the step S403 because facsimile communication cannot be suspended.

Moreover, in the embodiment mentioned above, a setting of an interrupt job may be limited on the basis of a scan setting of a preceding job.

For example, when the copy job to which the "staple" is set as the finishing setting is suspended, an interrupt job using the intermediate tray is not executable because a user cannot manually return printed sheets retracted from the intermediate tray as mentioned above. Even in such a case, an interrupt job like a send job that does not use the intermediate tray is executable without inconvenience because it is not necessary to retract printed sheets from the intermediate tray.

Next, a modified example of the interrupt job control process will be described. In the embodiment mentioned above, a type of an executable interrupt job depends on a scan setting of a preceding job.

As compared with this, an available function of an interrupt job is restricted on the basis of a scan setting of a preceding job in the modified example.

Figure 9:
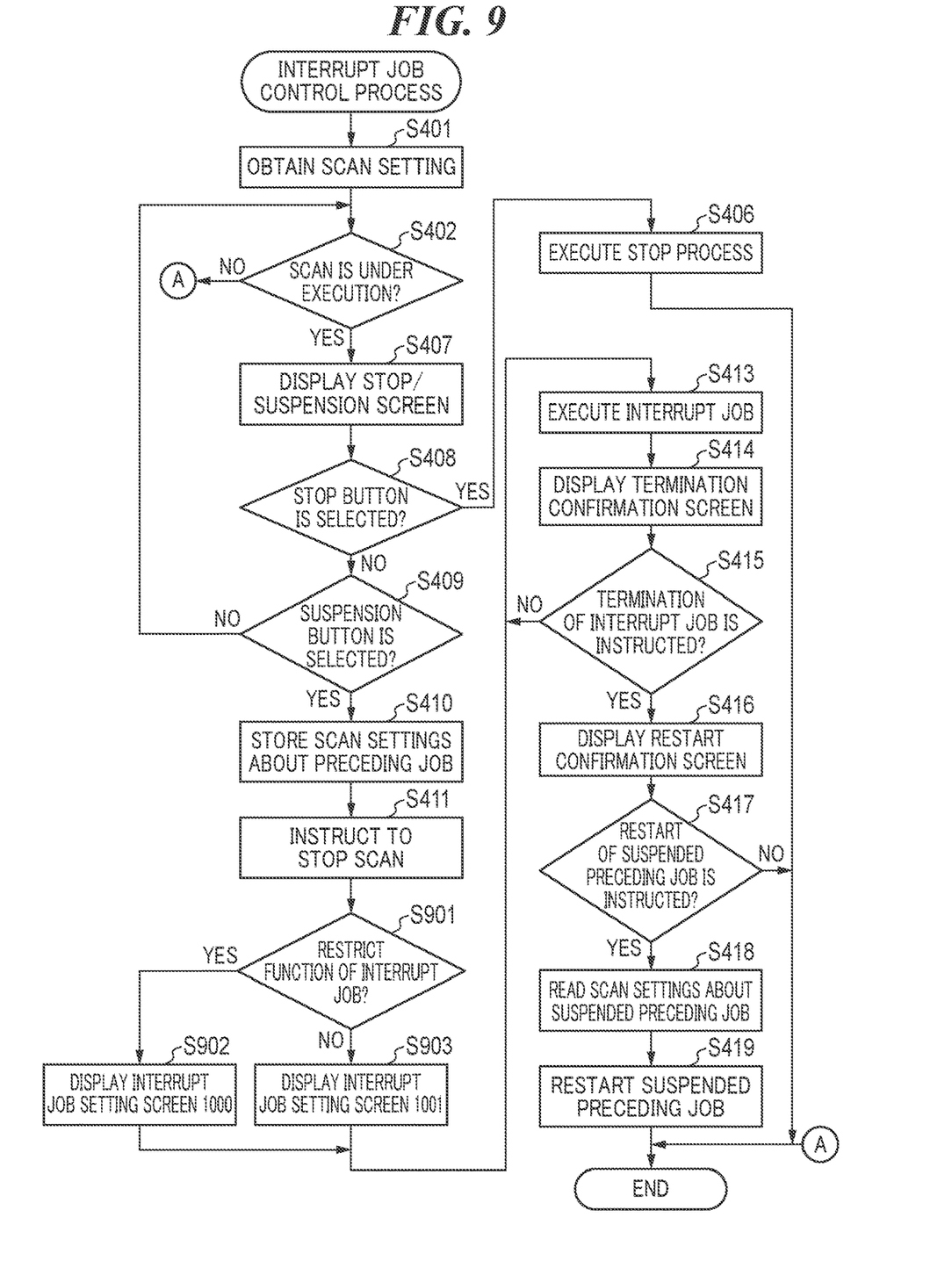
FIG. 9 is a flowchart showing procedures of a modified example of the interrupt job control of FIG. 4.

FIG. 9 is a flowchart showing procedures of a modified example of the interrupt job control of FIG. 4. The process of FIG. 9 is also achieved because the CPU 102 reads a control program from the ROM 103 to the RAM 104 and executes the control program as with the process of FIG. 4. Moreover, the process in FIG. 9 is also executed when an execution instruction for the above-mentioned scan-including job is received from a user as with the process of FIG. 4.

As shown in FIG. 9, the CPU 201 performs the processes in the steps S401 and S402. As a result of the determination in the step S402, when the scan with the scanner 114 is not under execution (i.e., when the scan with the scanner 114 is finished), the CPU 102 finishes this process. As a result of the determination in the step S402, when the scan with the scanner 114 is under execution, the CPU 102 executes the processes in the steps S407 and S408.

As a result of the determination in the step S408, when the stop button 603 is selected in the stop/suspension screen 602, the CPU 102 executes the process in the step S406 and finishes this process. As a result of the determination in the step S408, when the stop button 603 is not selected in the stop/suspension screen 602, the CPU 102 executes the processes in the steps S409 through S411.

Next, the CPU 102 reads the scan setting of the preceding job stored in the storage memory 105 and determines whether an available function of an interrupt job is restricted on the basis of the scan setting concerned (a step S901). In the step S901, when the finishing setting of the preceding job is the "staple", use of the copy function that may use the intermediate tray is prohibited, for example.

Although a case where the MFP 100 suspends one preceding job is described here, the MFP 100 may suspend a plurality of preceding jobs. When suspending a plurality of preceding jobs, the MFP 100 preferably restricts an available function of an interrupt job on the basis of the scan settings of all the suspended preceding jobs.

Figure 10A:
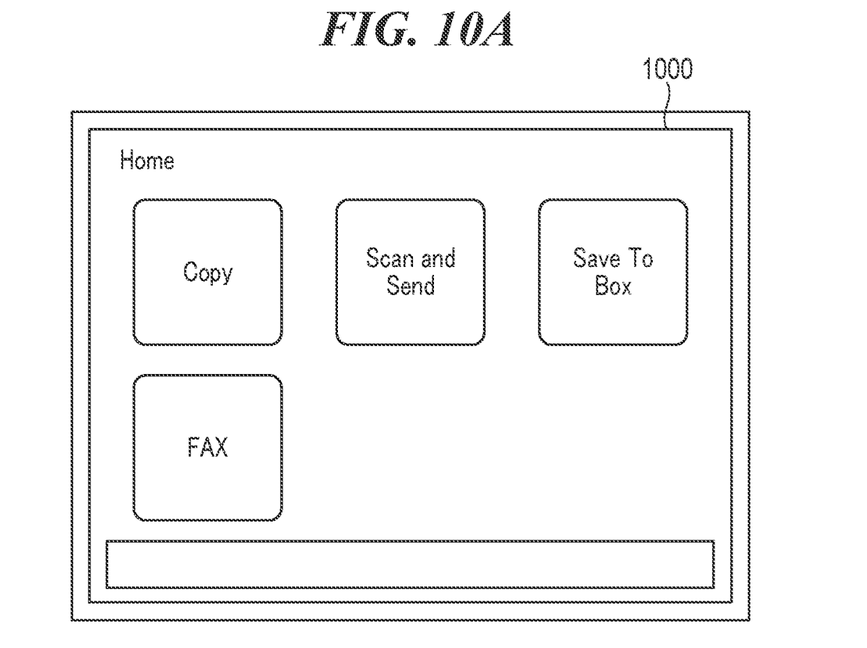
FIG. 10A and FIG. 10B are views showing examples of interrupt job setting screens displayed on the operation unit in FIG. 1 during the process of FIG. 9.

As a result of the determination in the step S901, when an available function of an interrupt job is not restricted, the CPU 102 displays an interrupt job setting screen 1000 of FIG. 10A on the operation unit 109 (a step S902). A user selects a type of an interrupt job through the interrupt job setting screen 1000, and then, performs a detailed setting like a scan setting about the interrupt job. Next, the CPU 102 performs the processes from the step S413.

Figure 10B:
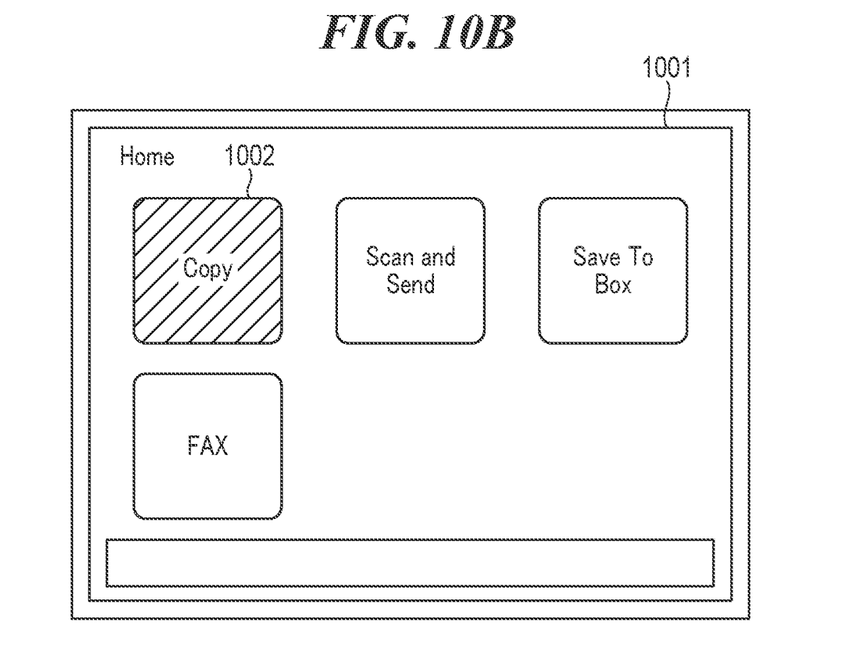

As a result of the determination in the step S901, when an available function of an interrupt job is restricted, the CPU 102 displays an interrupt job setting screen 1001 of FIG. 10B on the operation unit 109 (a step S903). In the interrupt job setting screen 1001, a selection button 1002 corresponding to the function of which use is restricted is displayed in the grayout state so that a user cannot select the function. Next, the CPU 102 performs the processes from the step S413.

An available function of an interrupt job is restricted on the basis of a scan setting of a preceding job in the modified example mentioned above. This enables execution of an interrupt scan without falling into a state where a preceding scan cannot restart.

Although the configuration that does not execute the processes in the steps S403 through S405 in FIG. 4 is described in FIG. 9 so as to facilitate the description, another configuration may be employed. For example, the processes in the steps S901 through S903 may be executed after executing the processes in the steps S401 through S411 in FIG. 4. In such a case, the processes from the step S413 may be executed after that.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-228438, filed Dec. 18, 2019, which is hereby incorporated by reference herein in its entirety.

What is claimed is:

1. An image scanning apparatus comprising:
a scanner that scans a document; and
a controller that determines whether interrupt execution of a second scan that is different from a first scan by the scanner is permitted, based on a finishing setting for a print product output based on image data generated by the first scan that is being executed,
wherein the scanner executes the second scan after suspending the first scan in a case where the interrupt execution of the second scan is permitted, and
wherein the scanner restarts the first scan after executing the second scan.

2. The image scanning apparatus according to claim 1, wherein interrupt execution of the second scan is not permitted in a case where a staple setting is set for a job for executing the first scan, the staple setting being a setting for stapling the print product output based on the image data generated by the first scan, and
wherein the interrupt execution of the second scan is permitted in a case where a finishing setting other than the staple setting is set for the job for executing the first scan.

3. The image scanning apparatus according to claim 1, wherein the finishing setting includes a predetermined setting corresponding to a post process that a user cannot reproduce a state of a suspension timing about the first scan,
wherein the interrupt execution of the second scan is not permitted in a case where the predetermined setting is set for a job executing the first scan, and
wherein the interrupt execution of the second scan is permitted in a case where a finishing setting other than the predetermined setting is set for a job executing the first scan.

4. The image scanning apparatus according to claim 1, wherein the controller restricts an available function in a job executing the second scan based on the setting for a job executing the first scan.

5. An image scanning apparatus comprising:
a scanner that scans a document; and
a controller that determines whether interrupt execution of a second scan that is different from a first scan by the scanner is permitted, based on a setting of a file format for image data generated by the first scan that is being executed,
wherein the scanner executes the second scan after suspending the first scan in a case where the interrupt execution of the second scan is permitted, and
wherein the scanner restarts the first scan after executing the second scan.

6. The image scanning apparatus according to claim 5, wherein the interrupt execution of the second scan is not permitted in a case where a predetermined file format is set as setting of the first scan, and the predetermined file format is a file format that enables to output images of a plurality of scanned pages as one image data, and
wherein the interrupt execution of the second scan is permitted in a case where a file format other than the predetermined file format is set as the setting of the first scan.

7. The image scanning apparatus according to claim 6, wherein the predetermined file format is PDF.

8. A control method for an image scanning apparatus that scans a document, the control method comprising:
determining whether interrupt execution of a second scan that is different from a first scan by the scanner is permitted, based on a finishing setting for a print product output based on image data generated by the first scan that is currently executed;
executing the second scan after suspending the first scan in a case where the interrupt execution of the second scan is permitted; and
restarting the first scan after executing the second scan.

9. A non-transitory computer-readable storage medium storing a control program causing a computer to execute a control method for an image scanning apparatus that scans a document, the control method comprising:
determining whether interrupt execution of a second scan that is different from a first scan by the scanner is permitted, based on a finishing setting for a print product output based on image data generated by the first scan that is currently executed;

executing the second scan after suspending the first scan in a case where the interrupt execution of the second scan is permitted; and restarting the first scan after executing the second scan.

\* \* \* \* \*